United States Patent [19]

Kawaguchi et al.

[11] Patent Number: 4,485,897
[45] Date of Patent: Dec. 4, 1984

[54] DISC BRAKE SYSTEM

[75] Inventors: Takeshi Kawaguchi, Saitama; Masayuki Seki, Nagano, both of Japan

[73] Assignee: Honda Giken Kogyo Kabushiki Kaisha, Tokyo, Japan

[21] Appl. No.: 410,336

[22] Filed: Aug. 23, 1982

[30] Foreign Application Priority Data

Sep. 11, 1981 [JP] Japan .................. 56-134263[U]
Sep. 14, 1981 [JP] Japan .................. 56-135438[U]
Sep. 14, 1981 [JP] Japan .................. 56-135439[U]

[51] Int. Cl.³ ........................................ F16D 55/224
[52] U.S. Cl. ............................ 188/73.39; 188/73.31
[58] Field of Search ............. 188/72.4, 73.31, 73.36, 188/73.37, 73.39, 73.43, 73.44, 73.45

[56] References Cited

U.S. PATENT DOCUMENTS

| | | | |
|---|---|---|---|
| 3,365,028 | 1/1968 | Hajek | 188/73.39 X |
| 3,517,778 | 6/1970 | Knapp | 188/73.45 |
| 4,046,234 | 9/1977 | Kurata | 188/73.36 X |
| 4,074,795 | 2/1978 | Kondo et al. | 188/73.45 X |

FOREIGN PATENT DOCUMENTS

| | | |
|---|---|---|
| 1525253 | 9/1978 | United Kingdom . |
| 1546727 | 5/1979 | United Kingdom . |
| 1548220 | 7/1979 | United Kingdom . |
| 1550617 | 8/1979 | United Kingdom . |
| 1551313 | 8/1979 | United Kingdom . |
| 2045876 | 11/1980 | United Kingdom . |
| 2079878 | 1/1982 | United Kingdom . |
| 2036213B | 11/1982 | United Kingdom . |

Primary Examiner—Duane A. Reger
Attorney, Agent, or Firm—Lyon & Lyon

[57] ABSTRACT

A disc brake having a caliper assembly support bracket and caliper assembly arranged with the caliper assembly slidably mounted in a U-shaped mounting socket to slide perpendicular to the braking surfaces of the brake disc. Brake pads extend between mounting faces of the socket on either side of the brake disc in such a way that the braking forces are resisted by the sliding engagement of the brake pads on the mounting faces. The interface width of the pads is increased to give better torsional resistance to the braking forces and hard stainless steel liners are disclosed for the mounting faces to extend the life of the support bracket.

9 Claims, 12 Drawing Figures

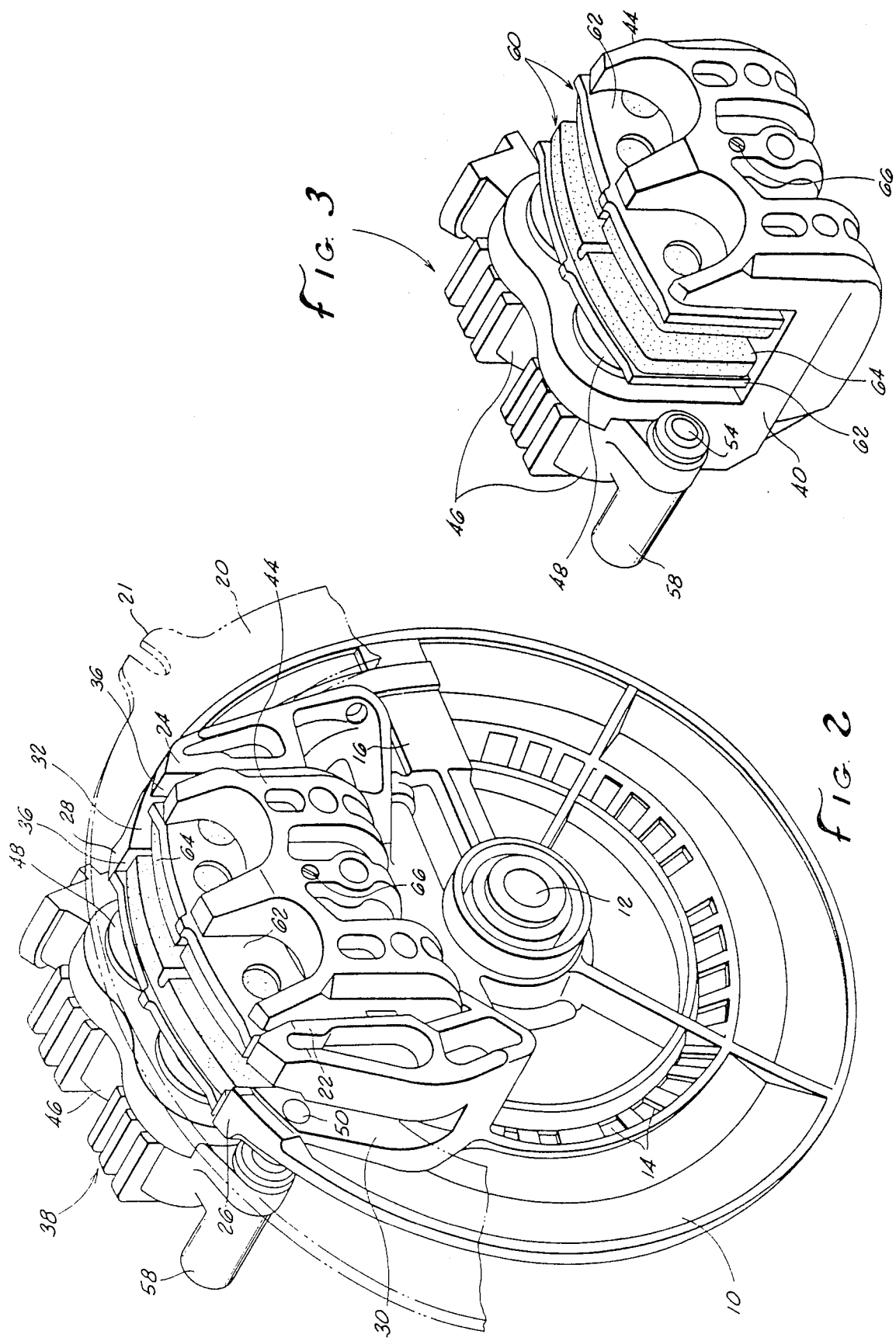

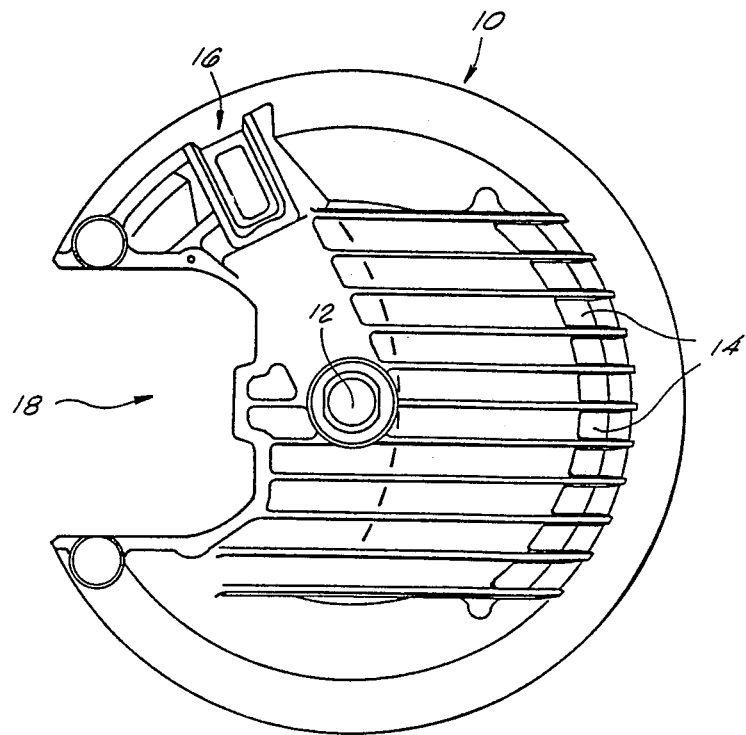
Fig. 4
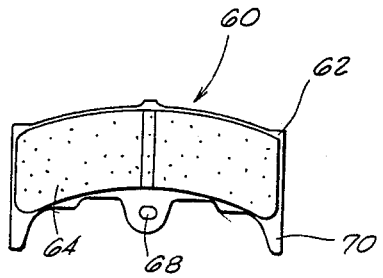
Fig. 5
Fig. 6
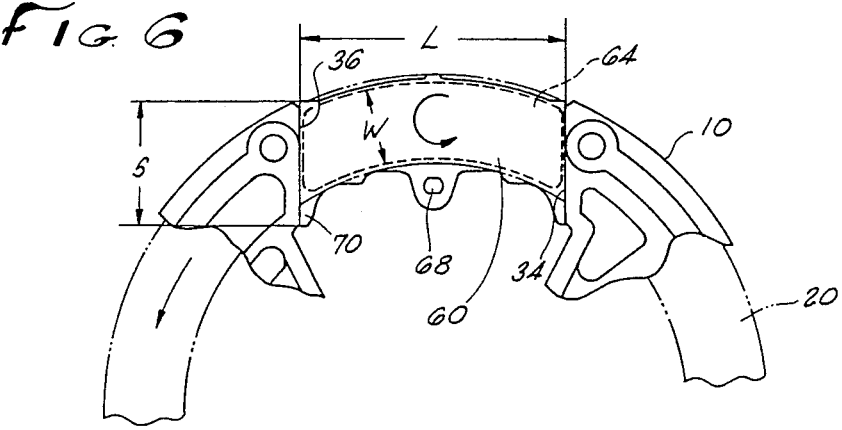

DISC BRAKE SYSTEM

BACKGROUND OF THE INVENTION

The field of the present invention is disc brake mechanisms for vehicles.

Disc brakes over the past several years have come to be generally employed on many vehicles, both automobiles and motorcycles. Because of the nature of such systems, it is relatively important to provide a rigid mounting for the caliper and brake pads. At the same time, the caliper must actuate and the pads move to effect the braking action. In constructing such systems, attention must be directed to the prevention of both linear motion and twisting motion of the pads in the direction of motion of the associated brake disc when braking. Additionally, as the parts must move into and out of braking action, wear must be avoided which would otherwise result in the aforementioned linear and twisting motion upon braking.

Heretofore disc brake systems have generally employed a caliper which is fixed to the vehicle on a support. The caliper in turn supports the brake pads. Thus, the support for rigidly positioning the pads is also the structure which is employed to actuate the braking motion. Close tolerance parts and expensive material must be employed to insure proper operation and adequate longevity of such systems. Furthermore, such systems tend to be large and heavy, detrimental aspects for any system carried as unsprung weight on a motorcycle.

SUMMARY OF THE INVENTION

The present invention is directed to an improved disc brake system which is able to simply and easily provide rigid positioning of the brake pad, provide a simple means for increasing system longevity and avoid certain expensive construction. To this end, a support bracket which extends on both sides of the disc is employed to reduce torsional loading. Additionally, the brake pads are individually held by the mounting system apart from the mounting of the caliper. Therefore, a rigid guide is provided which need not additionally act as the actuating means. Wear is also improved on the mounting mechanism for the pads by means of simple wear resistant liners. Thus, cost can be reduced, the system simplified, reduced in size and weight and generally improved in accordance with the present invention.

Accordingly, it is an object of the present invention to provide an improved disc brake system. Other and further objects and advantages will appear hereinafter.

BRIEF DESCRIPTION OF THE DRAWINGS

FIG. 2 is an assembled prospective back view of the device of FIG. 1.

FIG. 3 is a detailed prospective back view of a caliper assembly of the present invention.

FIG. 4 is a front view of a support bracket of the present invention for a front wheel of a motorcycle.

FIG. 5 is a front view of a disc brake pad of the present invention.

FIG. 6 is a partial front view of a disc brake pad of the present invention in position within a support bracket therefor.

DETAILED DESCRIPTION OF THE PREFERRED EMBODIMENT

Figure 1:
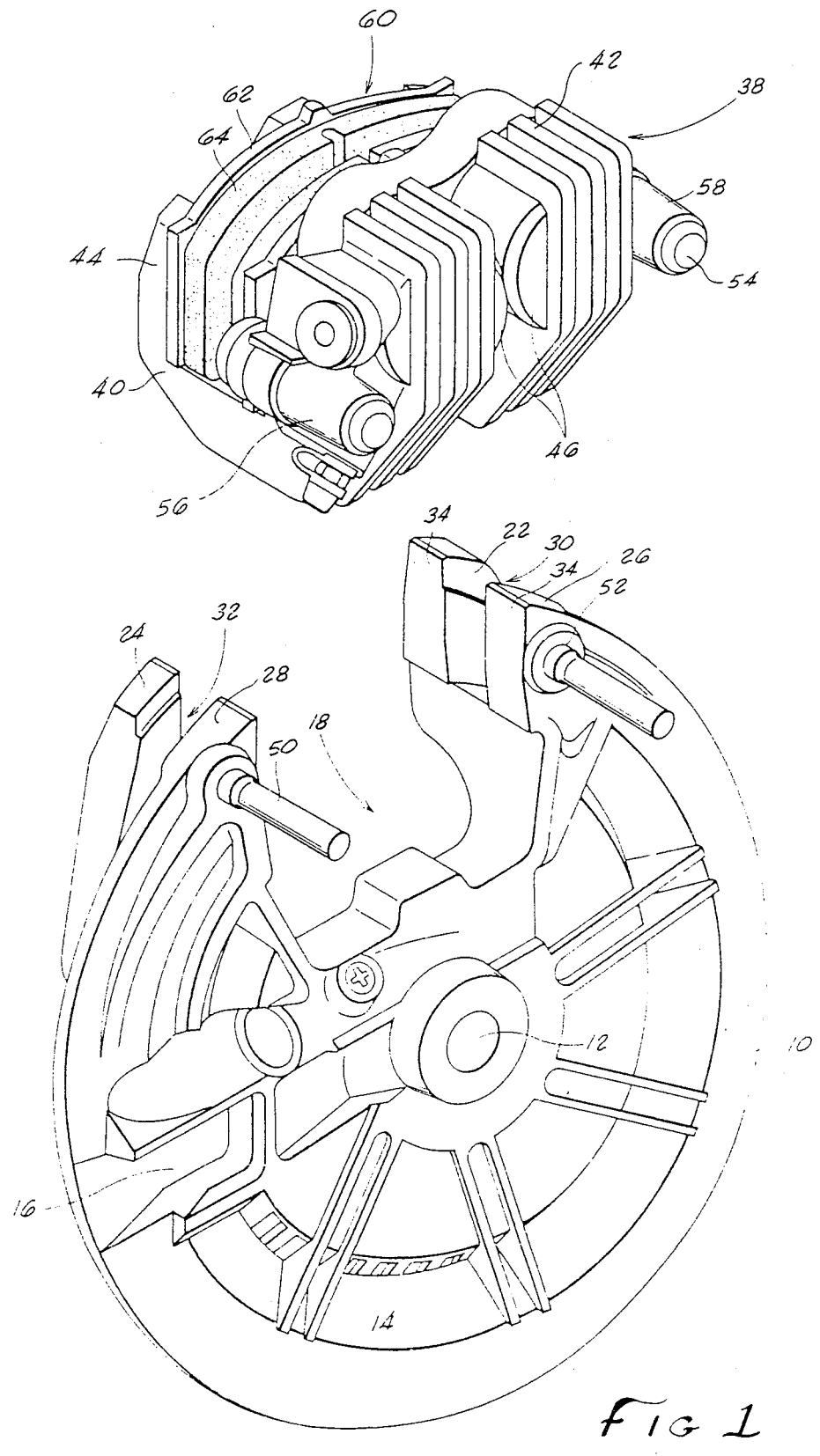
FIG. 1 is an exploded perspective front view of a support bracket and caliper assembly of the present invention.
Figure 7:
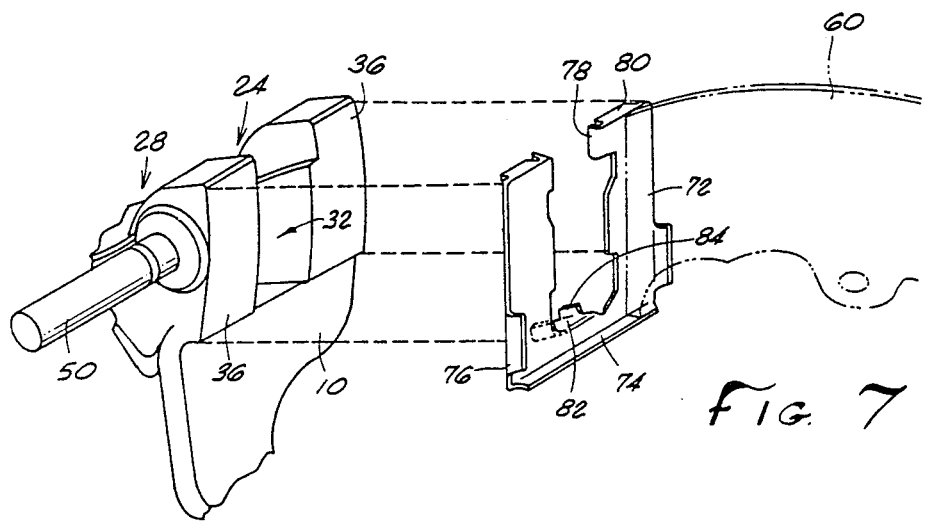
FIG. 7 is a prospective view of a liner of the present invention.
Figure 8:
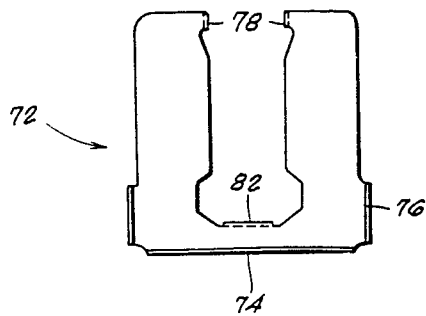
FIG. 8 is a front view of a liner of the present invention.
Figure 9:
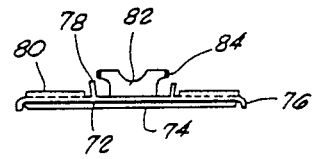
FIG. 9 is a top view of a liner of the present invention.
Figure 10:
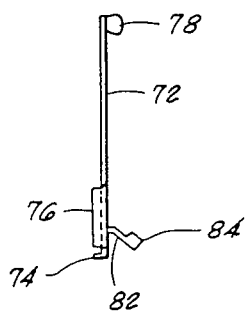
FIG. 10 is a side view of a liner of the present invention.
Figure 11:
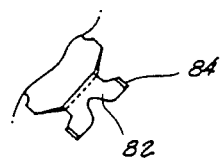
FIG. 11 is a top detail of the retaining flange of a liner of the present invention.
Figure 12:
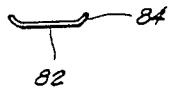
FIG. 12 is an end view of the retaining flange.

Turning in detail to the drawings, a support bracket 10 is illustrated which additionally is a cover or shroud for a disc brake. This preferred embodiment is generally anticipated to be employed with motorcycles. The support bracket 10 includes an axial hole 12 centrally located therein. Holes 14 for air flow through the cover and past the disc are included to enhance cooling efficiency. A groove 16 is arranged to fix the support bracket 10 to the frame of the vehicle. The groove 16 acts to resist torsional loading of the support bracket 10 about the axial hole 12 under braking conditions.

To accommodate a caliper assembly, the support bracket 10 includes a mounting socket 18 which is generally U-shaped in arrangement. The mounting socket 18 is sized to accommodate a caliper assembly and is arranged to extend on both sides of a brake disc 20 as shown in phantom in FIG. 2. The brake disc 20 is intended to be of the type mounted about its outer periphery at several points 21. Therefore, the support bracket 10 spans the brake disc 20 inwardly of the disc. Structural members 22 and 24 extend upwardly on the back side of the disc to approximate corresponding members 26 and 28 on the near side of the disc as viewed in FIG. 1. In this way, grooves 30 and 32 are arranged to accommodate the brake disc 20.

At the ends of the structural members 22, 24, 26 and 28, opposed mounting faces 34 and 36 are arranged to lie in parallel planes which are perpendicular to the braking surfaces of the brake disc 20. The planes of the mounting faces 34 and 36 are also generally parallel to a plane extending through the axis of the axial hole 12 and bisecting the gap between the faces 34 and 36. In this way, the mounting faces 34 and 36 are roughly normal to the path of travel of the brake disc 20. The support bracket 10 shown in FIGS. 1 and 2 is for the back wheel of a motorcycle. FIG. 4, employing corresponding reference numbers, illustrates a front wheel caliper assembly support bracket 10.

A caliper assembly 38 is fixed to the caliper assembly support bracket 10 by placement in the mounting socket 18. The caliper assembly 38 includes a unitary U-shaped structure 40 designed to span the brake disc inwardly of the disc between a cylinder housing 42 and an opposed member 44. Braking actuation is achieved by means of two brake cylinders 46 which actuate dual brake pistons 48. Braking is thus accomplished by clamping forces developed between the brake pistons 48 and the opposed member 44.

As the structure 40 is one piece as including the cylinder housing 42 and the opposed member 44, it is necessary that the structure 40 have the capability of movement relative to the braking surface of the brake disc 20 so as to cooperate with the brake pistons 48 in clamping the disc. Thus, the structure 40 is slidably mounted in the mounting socket 18 of the caliper assembly support bracket 10. Such sliding movement can occur in the direction perpendicular to the braking surface of the brake disc 20. To this end, alignment surfaces are provided on the support bracket 10 for sliding engagement with the caliper assembly in this direction. In the preferred embodiment, the alignment surfaces are pins 50 rigidly fixed to the support bracket 10 by being threaded into holes 52. Alignment holes 54 extend through two cylinders 56 and 58 formed in the structure 40 to act as guides in conjunction with the pins 50. In this way, the caliper assembly 38 is controlled to prevent motion except in the direction perpendicular to the braking surfaces of the brake disc 20. However, it is not anticipated that major resistance if any to the actual braking forces will be performed by the guide pins 50 and holes 52.

Located between the brake piston 48 and the opposed member 44 are brake pads 60. The brake pads 60 each have a brake pad member 62 and a liner 64 and are positioned for braking engagement with either side of the brake disc 20. The brake pads 60 are located by means of a pin 66 which is located through the opposed member 44 and into the cylinder housing structure 42. This pin 66 extends through a hole 68 in the lower most portion of the brake pad 60 to retain the pads in place. As with the pins 50, this pin 66 is not designed to take a major role if any in resisting the braking force of the system.

The brake pads 60 are arranged, as can best be seen in FIG. 6, to extend to each of the opposed mounting faces 34 and 36 such that they are in sliding engagement therewith. It is this engagement between the pad members 62 and the mounting faces 34 and 36 which provides the primary resistance to the braking forces of the system. Protrusions 70 increase both the length and area of the interface between the brake pad members 62 and the mounting faces 34 and 36 for additional resistance to moments and for reduced pressure at the interface. The forces which are specifically experienced by the brake pad 60 in resisting the braking motion are both linear and torsional. The linear forces are created by the relative motion of the disc 20 against the liner 64. Additionally, the rotational action of the disc 20 may be viewed as forcing upwardly on the right end of the brake pad 60, as viewed in FIG. 6, and downwardly on the left end. Thus, across the length "L" a torque is created during braking as indicated by the curved arrow. To specifically resist this torsional loading, the side width "S" is increased by means of the protrusions 70 over that of the pad width "W" to provide a greater effective moment arm for resisting this force.

To increase wear resistance yet not require expensive hardened major components, wear resistant liners 72 may be positioned on the opposed mounting faces 34 and 36 of the caliper assembly support bracket 10. The liners 72 may be of hardened or stainless steel to resist the sliding action under braking load of the brake pad members 62. In this way, the liners and brake pads 60 can be replaced as needed without wear to the support bracket 10.

The liners 72 include a number of flanges to aid in the location and retention of the liners 72. A bottom flange 74 extends underneath the brake pad member 62 and prevents the liner 72 from working itself upward from between the mounting faces 34 and 36 and the brake pad 60. Side flanges 76 help to retain the brake pads 60 in proper positioning on either side of the disc 20 while upper flanges 78 and 80 also help retain the orientation of the liner 72 on the mounting face. Lastly, a center flange 82 extends into the grooves 30 and 32. Claws 84 on the center flange 82 are pressfit into the groove 32 to bite into the sides of the structural members 24 and 28 for further retention. An identical liner 72 is of course used on the other mounting face 34.

Thus, an improved disc brake system has been disclosed which includes an advantageous caliper and brake pad mounting system for resisting braking forces. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A disc brake system for a wheeled vehicle, including a brake disc fixed to rotate with a wheel of the vehicle, a caliper assembly support bracket fixed to the vehicle and having a mounting socket with opposed mounting faces perpendicular to the braking surfaces of said brake disc, and a caliper assembly having opposed brake pads for braking engagement with said brake disc, said caliper assembly being fixed to said caliper assembly support bracket within said mounting socket, wherein the improvement comprises each of said opposed brake pad extends to each of said opposed mounting faces for sliding engagement therewith, the dimension of the interface of each said pad and each said opposed mounting surface being a length greater than the width of the braking surfaces of said brake disc, said greater length extending inward from the outer radial edge of the braking surface of said disc.

2. The disc brake system of claim 1 wherein the improvement further comprises said opposed mounting surfaces each including a pair of wear resistant liners, one liner for the forward mounting faces and one liner for the resrward mounting faces.

3. A disc brake system for a wheeled vehicle, comprising a disc fixed about its outer periphery to a wheel;

a caliper assembly support bracket fixed to the vehicle forming a disc cover and including a mounting socket spanning said brake disc inwardly of said disc with opposed mounting faces perpendicular to the braking surfaces of said brake disc extending on both sides of said brake disc and alignment surfaces perpendicular to the brake surface of said brake disc;

a caliper assembly having opposed brake pads for braking engagement with said brake disc, and caliper assembly being slidably affixed to said caliper assembly support bracket within said mounting socket on said alignment surfaces and spanning said brake disc inwardly of said disc and said brake pads extending to said opposed mounting faces for sliding engagement therewith and having an interface height dimension beginning about at the outer radial edge of said brake surface and extending inward from the inner radial edge of said brake surface a dimension less then the width of said brake surface.

4. The disc brake system of claim 3 wherein said brake pads and U-shaped side surfaces include a wear resistant liner covering the interfaces at one end and a separate wear resistant liner covering the interfaces at the other end.

5. The disc brake system of claim 3 wherein said alignment surfaces on said support bracket include guide pins extending perpendicular to the braking surfaces of said support bracket and said caliper assembly includes alignment holes for sliding engagement with said pins.

6. The disc brake system of claim 3 wherein the dimension of the interface of each said pad and each said opposed mounting surface is a height S greater than the width W of the braking surfaces of said brake disc, said greater length S extending inward from the outer radial edge of said braking surface.

7. The brake disc system of claim 6 wherein said opposed mounting surface include, a pair of wear resistant liner, one common liner for the forward mounting surfaces and one common liner for the rearward mounting surfaces.

8. The disc brake system of claim 3 wherein the height dimension S is measured from about the outer radial edge of the braking surface width W and extends inward from about the inner radial edge of the braking surface width W.

9. The disc brake system of claim 8 wherein the brake pads include a protrusion on the end faces at the inner radial edge of the braking surface, said protrusion providing said longer interface mounting surface.

* * * * *